(12) United States Patent
Akutsu et al.

(10) Patent No.: US 12,500,234 B2
(45) Date of Patent: Dec. 16, 2025

(54) SOLID-STATE BATTERY AND METHOD OF MANUFACTURING SOLID-STATE BATTERY

(71) Applicant: HONDA MOTOR CO., LTD., Tokyo (JP)

(72) Inventors: Shigemitsu Akutsu, Saitama (JP); Shinji Fujimoto, Saitama (JP); Toru Sukigara, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 640 days.

(21) Appl. No.: 17/664,223

(22) Filed: May 20, 2022

(65) Prior Publication Data

US 2022/0384802 A1 Dec. 1, 2022

(30) Foreign Application Priority Data

May 25, 2021 (JP) ................................. 2021-087701

(51) Int. Cl.
| | |
|---|---|
| *H01M 4/525* | (2010.01) |
| *H01M 4/04* | (2006.01) |
| *H01M 4/505* | (2010.01) |
| *H01M 10/052* | (2010.01) |
| *H01M 10/0562* | (2010.01) |
| *H01M 4/02* | (2006.01) |

(52) U.S. Cl.
CPC ......... *H01M 4/525* (2013.01); *H01M 4/0404* (2013.01); *H01M 4/0407* (2013.01);
(Continued)

(58) Field of Classification Search
CPC .. H01M 4/525; H01M 4/0404; H01M 4/0407; H01M 4/505; H01M 10/052;
(Continued)

(56) References Cited

U.S. PATENT DOCUMENTS

| | | | |
|---|---|---|---|
| 6,645,675 B1 * | 11/2003 | Munshi | H01M 4/0404 429/234 |
| 2003/0054256 A1 | 3/2003 | Takahashi et al. | |

(Continued)

FOREIGN PATENT DOCUMENTS

| | | |
|---|---|---|
| CN | 103548196 A | 1/2014 |
| JP | 2003109666 A | 4/2003 |

(Continued)

OTHER PUBLICATIONS

Office Action issued in the CN Patent Application No. CN202210564993.X, mailed on Mar. 30, 2024.

(Continued)

*Primary Examiner* — Milton I Cano
*Assistant Examiner* — Albert Michael Hilton
(74) *Attorney, Agent, or Firm* — CKC & PARTNERS CO., LLC

(57) ABSTRACT

Provided is a solid-state battery having a bipolar electrode plate and capable of reducing the lamination space factor of a solid electrolyte and reducing electrical resistivity. The solid-state battery includes: a laminate including a positive electrode plate, at least one bipolar electrode plate, and a negative electrode plate that are laminated; and a solid electrolyte layer formed on a lamination surface of the at least bipolar electrode plate.

6 Claims, 17 Drawing Sheets

(52) U.S. Cl.
CPC ......... *H01M 4/505* (2013.01); *H01M 10/052* (2013.01); *H01M 10/0562* (2013.01); *H01M 2004/028* (2013.01); *H01M 2004/029* (2013.01); *H01M 2300/0065* (2013.01)

(58) Field of Classification Search
CPC ....... H01M 10/0562; H01M 2004/028; H01M 2004/029; H01M 2300/0065
See application file for complete search history.

(56) References Cited

U.S. PATENT DOCUMENTS

| | | | | |
|---|---|---|---|---|
| 2009/0286141 | A1* | 11/2009 | Nakamura | H01M 10/0565 429/82 |
| 2014/0079992 | A1 | 3/2014 | Tanaka | |
| 2022/0059869 | A1* | 2/2022 | Tanaka | H01M 4/131 |

FOREIGN PATENT DOCUMENTS

| | | | |
|---|---|---|---|
| JP | 2010205479 | A | 9/2010 |
| JP | 2011100623 | A | 5/2011 |
| JP | 2012089421 | A | 5/2012 |
| JP | 2019212632 | A | 12/2019 |
| WO | 2012164642 | A1 | 12/2012 |
| WO | 2018110133 | A1 | 6/2018 |

OTHER PUBLICATIONS

Notification of Reasons for Refusal issued Dec. 3, 2024 in the JP Patent Application No. 2021-087701.

* cited by examiner

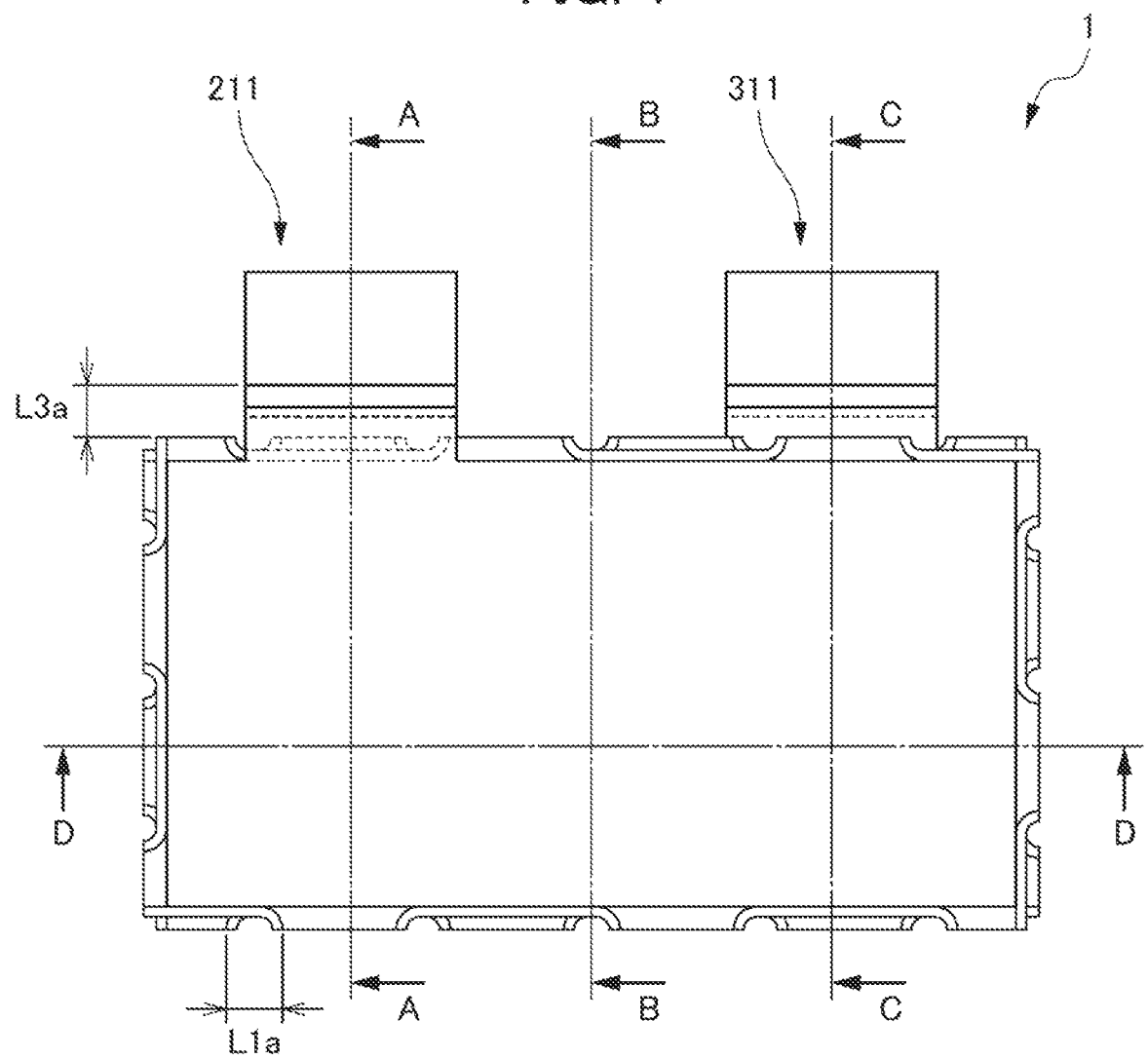

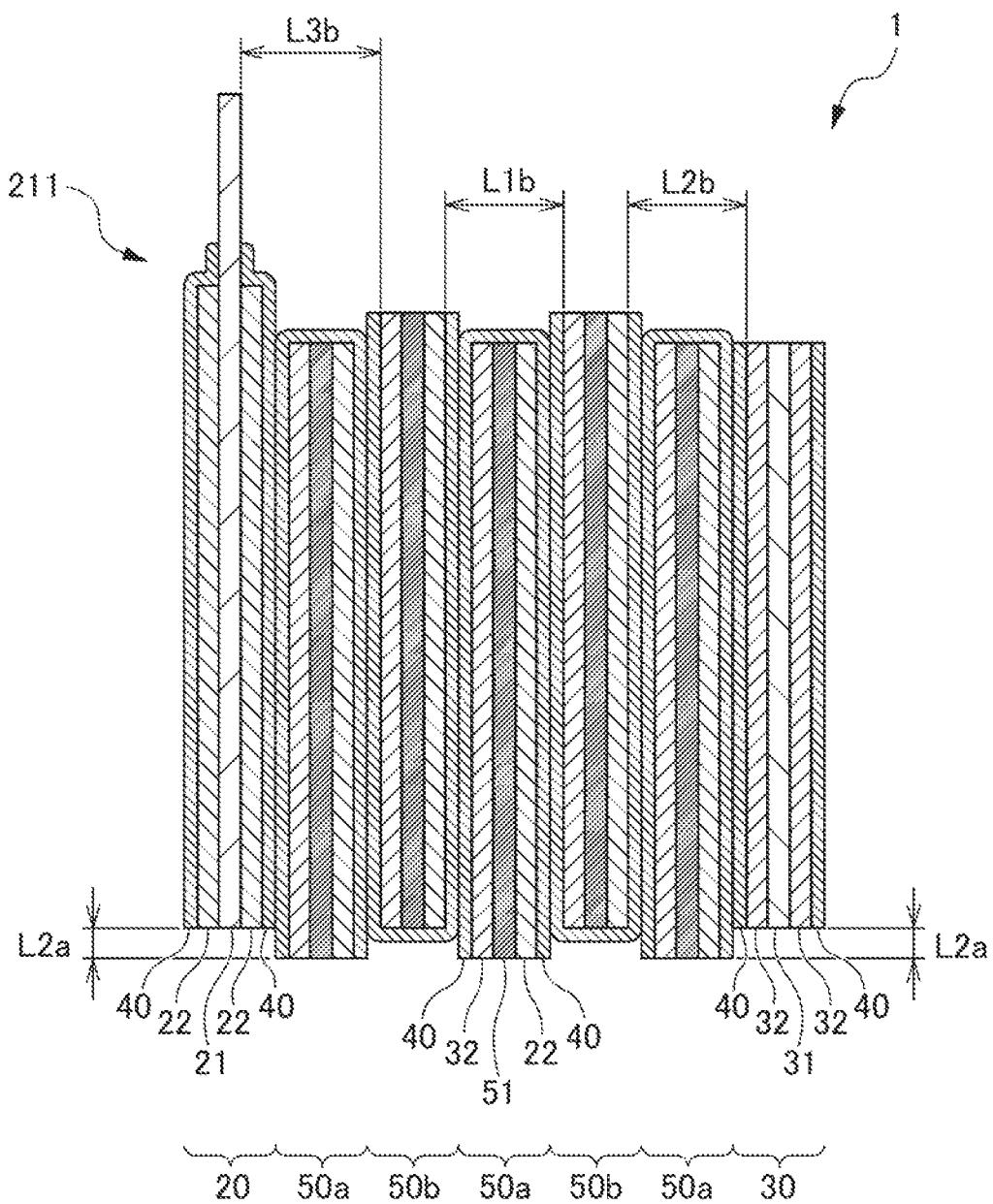

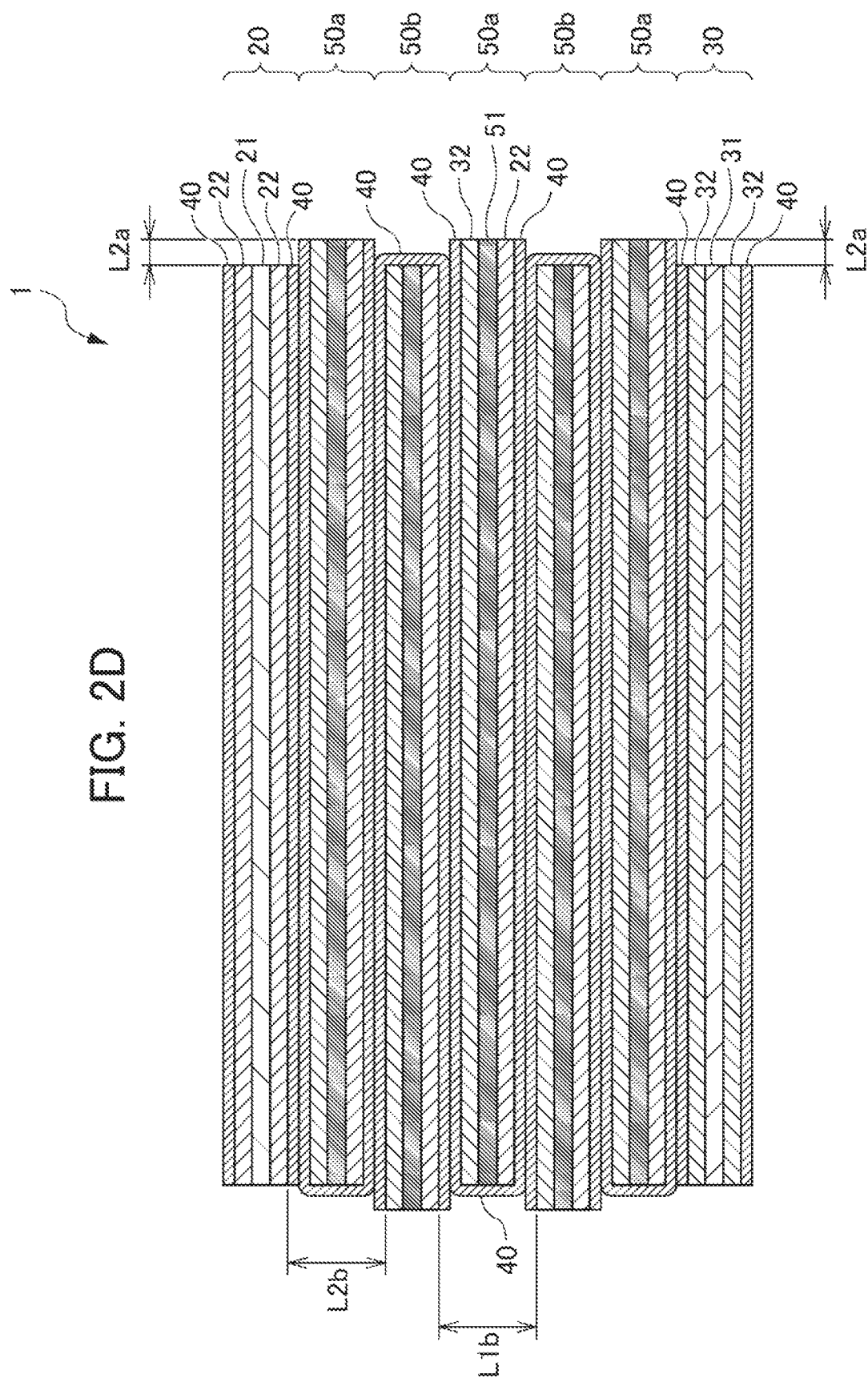

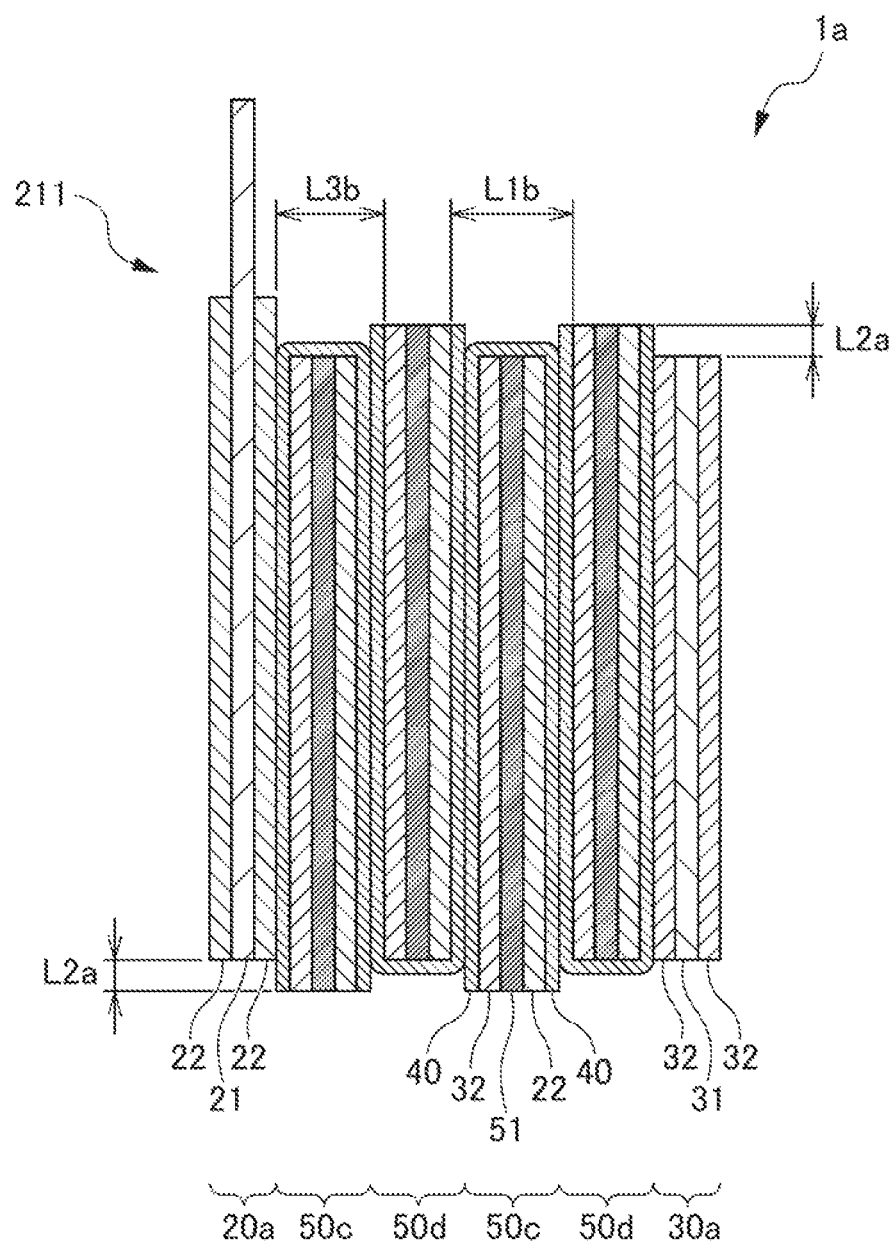

SOLID-STATE BATTERY AND METHOD OF MANUFACTURING SOLID-STATE BATTERY

This application is based on and claims the benefit of priority from Japanese Patent Application No. 2021-087701, filed on 25 May 2021, the content of which is incorporated herein by reference.

BACKGROUND OF THE INVENTION

Field of the Invention

The present invention relates to a solid-state battery and a method of manufacturing a solid-state battery.

Related Art

Lithium-ion secondary batteries have been conventionally widely used as secondary batteries having a high energy density. A lithium-ion secondary battery has a structure in which a separator is present between a positive electrode and a negative electrode and the structure is filled with a liquid electrolyte.

The electrolytic solution of the lithium-ion secondary battery is usually a flammable organic solvent, which may cause a particular problem in terms of safety against heat. Therefore, a solid-state battery including an inorganic solid electrolyte instead of the organic liquid electrolyte has been proposed. For example, a technique relating to a solid-state battery including a laminate having a positive electrode layer, a negative electrode layer, and a solid electrolyte layer arranged between the positive electrode layer and the negative electrode layer has been proposed (see Patent Document 1).

A solid-state battery including bipolar electrode plates is also configured so that a solid electrolyte layer is laminated between the bipolar electrode plates.

Patent Document 1: Japanese Unexamined Patent Application, Publication No. 2010-205479

SUMMARY OF THE INVENTION

In the solid-state battery disclosed in Patent Document 1, a sheet-shaped solid electrolyte layer formed by compression molding is arranged between respective electrode layers. Since the sheet-shaped solid electrolyte layer is required to have strength, it is necessary to have a thickness of about several tens of μm. Therefore, there is room for improvement in that the lamination space factor of the solid electrolyte increases and the electrical resistivity increases due to increase in the distance between electrodes.

The present invention has been made in view of the above circumstances, and has an object to provide a solid-state battery including bipolar electrode plates that is capable of reducing the lamination space factor of a solid electrolyte and reducing electrical resistivity.

A first aspect of the present invention is directed to a solid-state battery including: a laminate including a positive electrode plate, at least one bipolar electrode plate, and a negative electrode plate that are laminated; and a solid electrolyte layer formed on a lamination surface of the at least one bipolar electrode plate.

The first aspect of the present invention provides a solid-state battery including a bipolar electrode plate, and capable of reducing the lamination space factor of a solid electrolyte and reducing electrical resistivity.

A second aspect of the present invention is directed to the solid-state battery of the first aspect, in which the solid electrolyte layer is formed on at least a part of an end face of the at least one bipolar electrode plate.

The second aspect of the present invention makes it possible to ensure the insulation between the end faces of the bipolar electrode plates.

A third aspect of the present invention is directed to the solid-state battery according to the first or second aspect, in which the at least one bipolar electrode plate includes a plurality of bipolar electrode plates, the plurality of bipolar electrode plates each have, on an end face thereof, a concave portion on which the solid electrolyte layer is formed and a convex portion on which the solid electrolyte layer is not formed, and the concave portion and the convex portion are arranged to be staggered between adjacent ones of the plurality of bipolar electrode plates.

According to the third aspect of the present invention, even when the electrode plate has thereon a thin solid electrolyte layer instead of the sheet-shaped solid electrolyte layer, the insulation between the electrode plates can be ensured.

A fourth aspect of the present invention is directed to the solid-state battery of the third aspect, in which the concave portion of one of the bipolar electrode plates that is arranged adjacent to the positive electrode plate or the negative electrode plate is arranged at a position corresponding to an electrode tab extending from the positive electrode plate or the negative electrode plate and is larger in width than the electrode tab.

The fourth aspect of the invention makes it possible to ensure the insulation between the end face of the bipolar electrode plate and the electrode tab extending from the positive electrode plate or the negative electrode plate, and to produce a laminate without forming any solid electrolyte layer on the positive electrode plate or the negative electrode plate, whereby the manufacturing process of the solid-state battery can be simplified.

A fifth aspect of the present invention is directed to the solid-state battery of any one of the first to fourth aspects, in which the solid electrolyte layer is formed on a lamination surface of the positive electrode plate and a lamination surface of the negative electrode plate.

The fifth aspect of the present invention makes it possible to produce a laminate capable of ensuring the insulation among the positive and negative electrode plates and the end faces of the bipolar electrode plates.

A sixth aspect of the present invention is directed to the solid-state battery of any one of the first to fifth aspects, in which the at least one bipolar electrode plate includes a plurality of bipolar electrode plates, and adjacent ones of the plurality of bipolar electrode plates have shapes that are mutually in a mirror-image relation.

The sixth aspect of the present invention makes it possible to form the bipolar electrode plates into shapes suitable for ensuring the insulation between the end faces of the bipolar electrode plates.

A seventh aspect of the present invention is directed to a method of manufacturing a solid-state battery, the method including a bipolar electrode plate producing process. The bipolar electrode plate producing process includes, in sequence: an electrode material coating step of coating one surface of a current collecting plate with a positive electrode material and coating the other surface of the current collecting plate with a negative electrode material; a perforating step of forming a hole in a part of the current collecting plate coated with an electrode material; a solid electrolyte coating step of coating, with a solid electrolyte, the current collecting plate coated with the electrode material; and a cutting step of cutting the current collecting plate coated with the electrode material along a cutting line extending across the hole so that a concave portion is formed at an edge of the current collecting plate.

The seventh aspect of the present invention makes it possible to efficiently produce a bipolar electrode plate in which a solid electrolyte layer is formed on at least a part of an end face thereof, and to reduce the manufacturing cost of the solid-state battery.

An eighth aspect of the present invention is directed to the method according to the seventh aspect, in which in the bipolar electrode plate producing process, the perforating step includes forming the hole including a plurality of holes in rows such that the holes in adjacent ones of the rows are staggered, thereby producing the bipolar electrode plates having two types of shapes that are mutually in a mirror-image relation.

According to the eighth aspect of the present invention, since the bipolar electrode plates having two types of shapes that are mutually in a mirror-image relation can be produced from a single sheet-shaped current collecting plate, the manufacturing cost of the solid-state battery can be reduced.

BRIEF DESCRIPTION OF THE DRAWINGS

FIG. 1 is a diagram showing an outline of a laminate according to a first embodiment of the present invention;

FIG. 2A is a cross-sectional view taken along a line A-A of FIG. 1;

FIG. 2D is a cross-sectional view taken along a line D-D of FIG. 1;

FIG. 6A is a cross-sectional view taken along a line A-A of FIG. 5;

DETAILED DESCRIPTION OF THE INVENTION

First Embodiment

<Solid-State Battery>

Figure 2B:
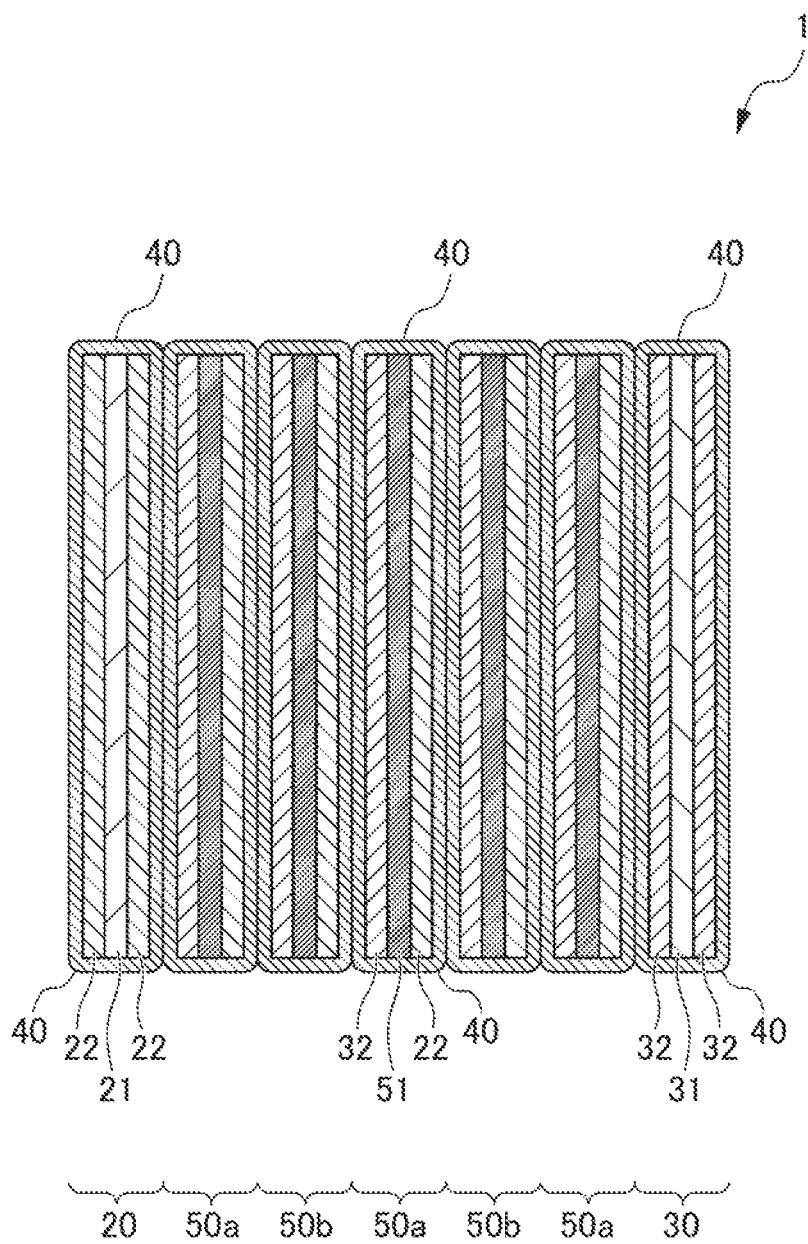
FIG. 2B is a cross-sectional view taken along a line B-B of FIG. 1.

A solid-state battery according to the present embodiment includes a laminate formed by laminating a positive electrode plate, bipolar electrode plates, and a negative electrode plate. The laminate is accommodated in an outer packaging body, and the positive electrode plate and the negative electrode plate are electrically connected to a positive electrode and a negative electrode, respectively.

[Laminate]

As shown in FIGS. 1 and 2A to 2D, the laminate according to the present embodiment has a configuration in which a positive electrode plate 20 and a negative electrode plate 30 are arranged at both end portions of the laminate, and two types of bipolar electrode plates 50a and 50b are alternately laminated between the positive electrode plate 20 and the negative electrode plate 30.

(Positive Electrode Plate)

As shown in FIGS. 2A to 2D, the positive electrode plate 20 includes a positive electrode current collecting plate 21, a positive electrode active material layer 22 which is formed on the positive electrode current collecting plate 21 and contains a positive electrode active material, a solid electrolyte layer 40 which is formed on the positive electrode active material layer 22 and contains a solid electrolyte, and a positive electrode tab 211 formed by extending the positive electrode current collecting plate 21.

The positive electrode current collecting plate 21 is not particularly limited, and is formed of a known current collection material that can be used for the positive electrode of a solid-state battery. It is formed of, for example, aluminum, aluminum alloy, stainless steel, nickel, iron, titanium, or the like.

The positive electrode active material constituting the positive electrode active material layer 22 is not particularly limited, and a known material capable of occluding and releasing a charge transfer medium such as lithium ion can be appropriately selected and used. Examples of the positive electrode active material include lithium cobaltate, lithium nickelate, lithium manganate, heterogeneous element substituted Li—Mn spinel, lithium metal phosphate, lithium sulfide, sulfur, and the like. Specific Examples of the positive electrode active material include $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, etc. In addition to the positive electrode active material, the positive electrode active material layer 22 may optionally contain a conductive auxiliary agent, a binder, or the like.

(Negative Electrode Plate)

As shown in FIGS. 2A to 2D, the negative electrode plate 30 includes a negative electrode current collecting plate 31, a negative electrode active material layer 32 which is formed on the negative electrode current collecting plate 31 and contains a negative electrode active material, a solid electrolyte layer 40 which is formed on the negative electrode active material layer 32 and contains the solid electrolyte, and a negative electrode tab 311 formed by extending the negative electrode current collecting plate 31.

The negative electrode active material constituting the negative electrode active material layer 32 is not particularly limited, and a known material capable of occluding and releasing a charge transfer medium such as lithium ion can be appropriately selected and used. Examples of the negative electrode active material include lithium transition metal oxides such as lithium titanate, transition metal oxides such as $TiO_2$, $Nb_2O_3$ and $WO_3$, Si, SiO, metal sulfides, metal nitrides, carbon materials such as artificial graphite, natural graphite, graphite, soft carbon and hard carbon, metallic lithium, metallic indium, and lithium alloys. In addition to the negative electrode active material, the negative electrode active material layer 32 may optionally contain a conductive auxiliary agent, a binder, and the like.

(Bipolar Electrode Plate)

As shown in FIGS. 2A to 2D, each of the bipolar electrode plates 50a and 50b is an electrode plate including a current collecting plate 51, a positive electrode active material layer 22 serving as a positive electrode of a polarizable electrode and formed on one surface of the current collecting plate 51, and a negative electrode active material layer 32 serving as a negative electrode of the polarizable electrode and formed on the other surface of the current collecting plate 51. The positive electrode active material layer 22 and the negative electrode active material layer 32 can have the same configurations as described above. A solid electrolyte layer 40 containing a solid electrolyte is formed on the positive electrode active material layer 22 and the negative electrode active material layer 32. The current collecting plate 51 is not particularly limited, and examples thereof include stainless steel foil, and the like.

The solid electrolyte layer 40 is a layer having a thickness of about several μm and formed on the positive electrode plate 20, the negative electrode plate 30, and the positive electrode active material layer 22 and the negative electrode active material layer 32 of each of the bipolar electrode plates 50a and 50b. The solid electrolyte layer 40 contains at least a solid electrolyte material which is a solid or gelatinous electrolyte. Charge transfer between the positive electrode active material and the negative electrode active material can be performed through the solid electrolyte material. The solid electrolyte material contained in the solid electrolyte layer 40 is not particularly limited, and for example, a sulfide solid electrolyte material, an oxide solid electrolyte material, a nitride solid electrolyte material, a halide solid electrolyte material, and the like can be used.

The formation of the solid electrolyte layer 40 on the positive electrode active material layer 22 and the negative electrode active material layer 32 makes it possible to set the thickness of the solid electrolyte layer 40 to about several μm, so that the lamination space factor of the solid electrolyte can be reduced, and the electrical resistivity can be reduced. Further, the configuration of the bipolar electrode described below provides the solid-state battery according to the present embodiment with an advantage that insulation between the electrodes can be ensured although it has a thin solid electrolyte layer, and further the manufacturing process and the structure can be simplified.

Figure 2C:
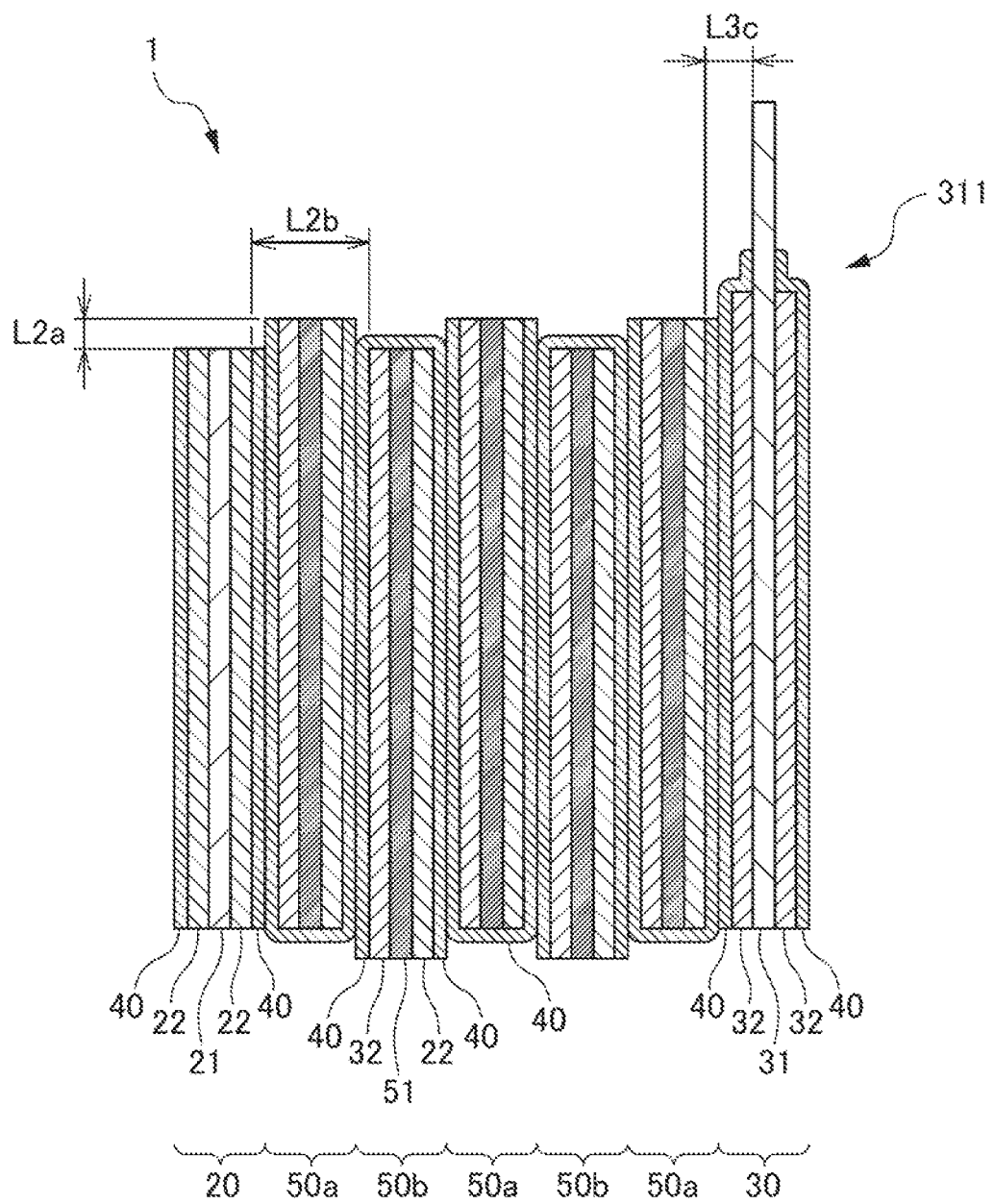
FIG. 2C is a cross-sectional view taken along a line C-C of FIG. 1.
Figure 3:
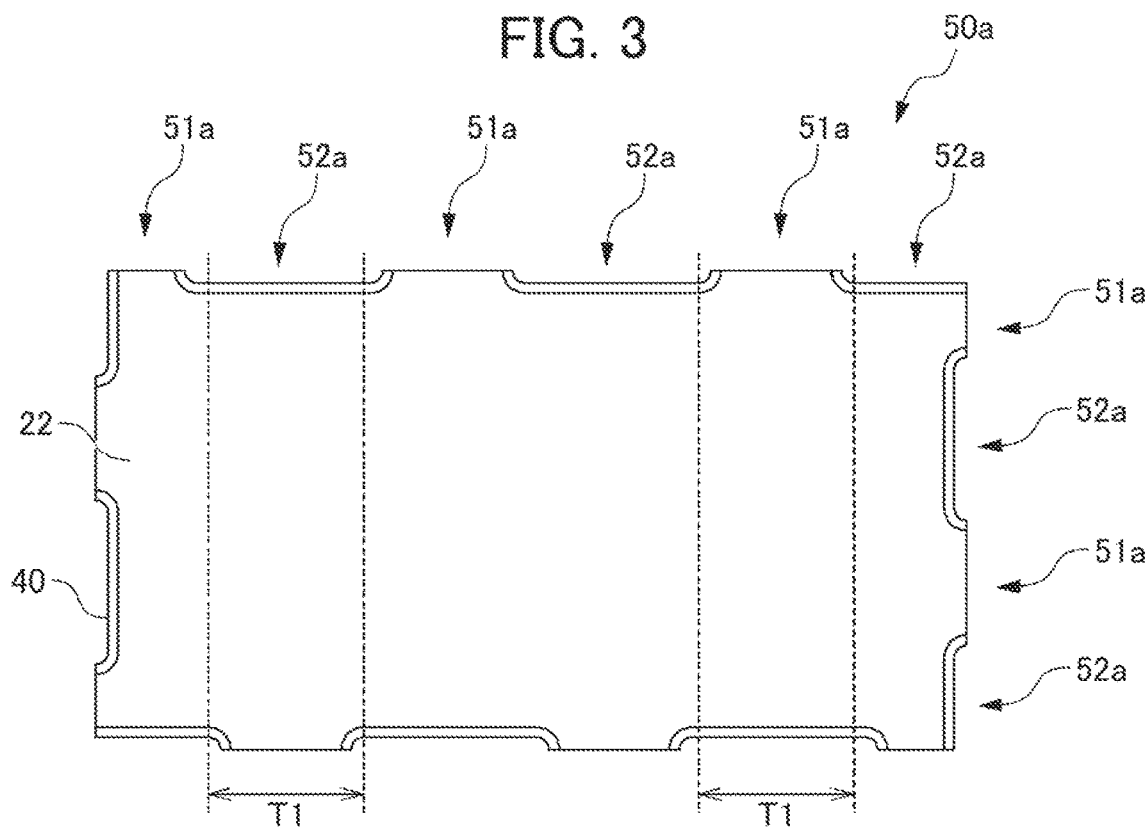
FIG. 3 is a diagram showing an outline of a bipolar electrode plate according to the first embodiment of the present invention.
Figure 4:
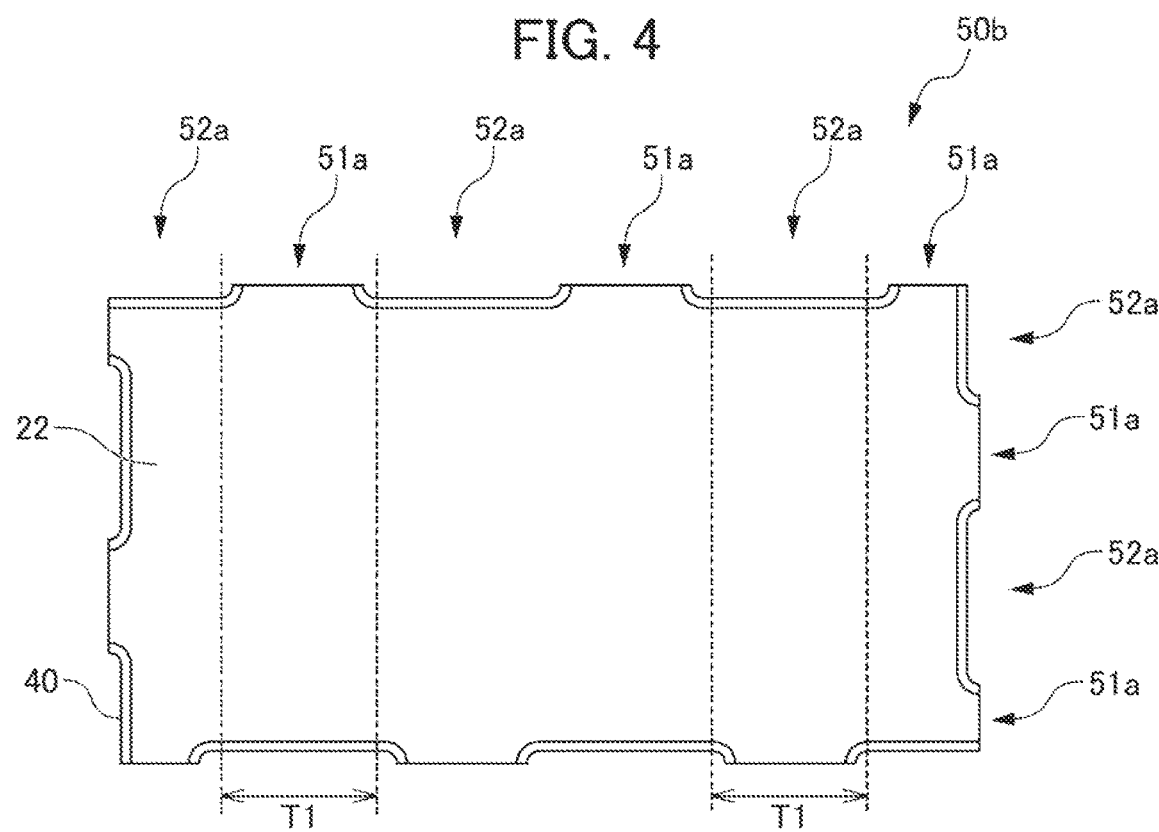
FIG. 4 is a diagram showing an outline of a bipolar electrode plate according to the first embodiment of the present invention.

The configurations of the bipolar electrode plates 50a and 50b are shown in FIGS. 3 and 4, respectively. FIGS. 3 and 4 are diagrams showing the bipolar electrode plates 50a and 50b as viewed from a lamination surface side on which the positive electrode active material layer 22 is formed, respectively. The bipolar electrode plates 50a and 50b have shapes which are mutually in a mirror-image relation, and end faces of which are provided with convex portions 51a and concave portions 52a that are alternately formed. The solid electrolyte layer 40 is not formed on the end faces of the convex portions 51a, whereas the solid electrolyte layer 40 is formed on the end faces of the concave portions 52a. In the laminate 1, the bipolar electrode plates 50a and 50b are alternately laminated as shown in FIGS. 2A to 2D. The number of laminated layers of the bipolar electrode plates 50a and 50b is not particularly limited, and it is only necessary for the bipolar electrode plates 50a and 50b to be alternately laminated. Simply laminating the bipolar electrode plates requires consideration to how to ensure the insulation between the end faces thereof. In contrast, alternately laminating the bipolar electrode plates 50a and 50b having the above configurations makes it possible to ensure the insulation between the bipolar electrode plates 50a and 50b.

As shown in FIG. 1, the convex portions 51a and the concave portions 52a of the bipolar electrode plates 50a and 50b are arranged to be staggered when viewed in a laminating direction. Further, the width of the concave portion 52a is larger than that of the convex portion 51a. As a result, as shown in FIGS. 1, 2A, and 2D, between the convex portions 51a of the bipolar electrode plates 50a and 50b, an insulation distance L1a can be ensured as viewed in the laminating direction, and an insulation distance L1b can be ensured as viewed on a cross-section of the laminate. The width of the concave portion 52a is not particularly limited, but it may be set to be larger than, for example, the width T1 of the positive electrode tab 211 and the negative electrode tab 311. The width of the convex portion 51a may be set to be smaller than, for example, the width T1.

Convex portions 51a or concave portions 52a are formed on the end faces of the bipolar electrode plates 50a and 50b. As a result, insulation is ensured between the concave portions 52a and the end faces of the positive electrode plate 20 and the negative electrode plate 30. Further, as shown in FIGS. 2A, 2C, and 2D, insulation distances L2a and L2b can be ensured between the convex portions 51a and the end faces of the positive electrode plate 20 and the negative electrode plate 30 where the positive electrode tab 211 and the negative electrode tab 311 are not arranged as viewed on a cross-section of the laminate. The insulation distance L2a is ensured by arranging the convex portions 51a such that the convex portions 51a protrude outward with respect to the end faces of the positive electrode plate 20 and the negative electrode plate 30.

In the present embodiment, the bipolar electrode plates 50a are provided adjacent to the positive electrode plate 20 and the negative electrode plate 30. As shown in FIGS. 2A and 2C, the solid electrolyte layer 40 having a certain length in a tab extending direction is formed on the lamination surface of each of the positive electrode tab 211 and the negative electrode tab 311. As a result, as shown in FIG. 1, an insulation distance L3a can be ensured between the positive electrode tab 211 and the negative electrode tab 311 and the convex portions 51a of the bipolar electrode plates 50a as viewed in the laminating direction. Further, as shown in FIG. 2A, an insulation distance L3b can be ensured between the positive electrode tab 211 and the convex portion 51a of the bipolar electrode plate 50b as viewed on a cross-section of the laminate. Similarly, as shown in FIG.

2C, an insulation distance L3c can be ensured between the negative electrode tab 311 and the convex portion 51a of the bipolar electrode plate 50a as viewed on a cross-section of the laminate.

<Method of Manufacturing Solid-State Battery>

Figure 12:
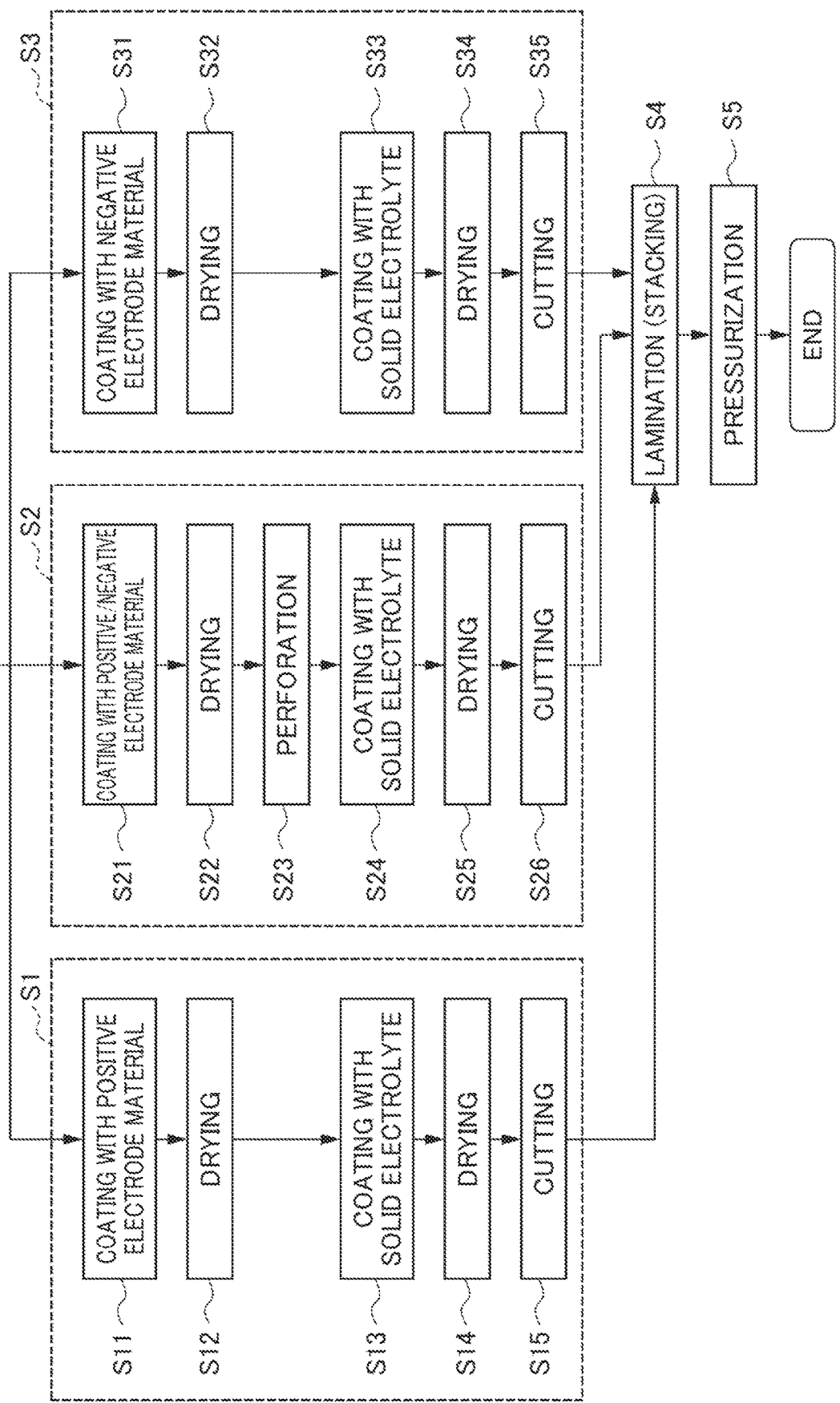
FIG. 12 is a flowchart showing a process for manufacturing a solid-state battery according to the first embodiment of the present invention.

As shown in FIG. 12, a method of manufacturing a solid-state battery according to the present embodiment includes a positive electrode plate producing process S1, a bipolar electrode plate producing process S2, a negative electrode plate producing process S3, a laminating step S4, and a pressurizing step S5.

As shown in FIG. 12, the positive electrode plate producing process S1 includes a positive electrode material coating step S11, a drying step S12, a solid electrolyte coating step S13, a drying step S14, and a cutting step 15 in this order.

Figure 10:
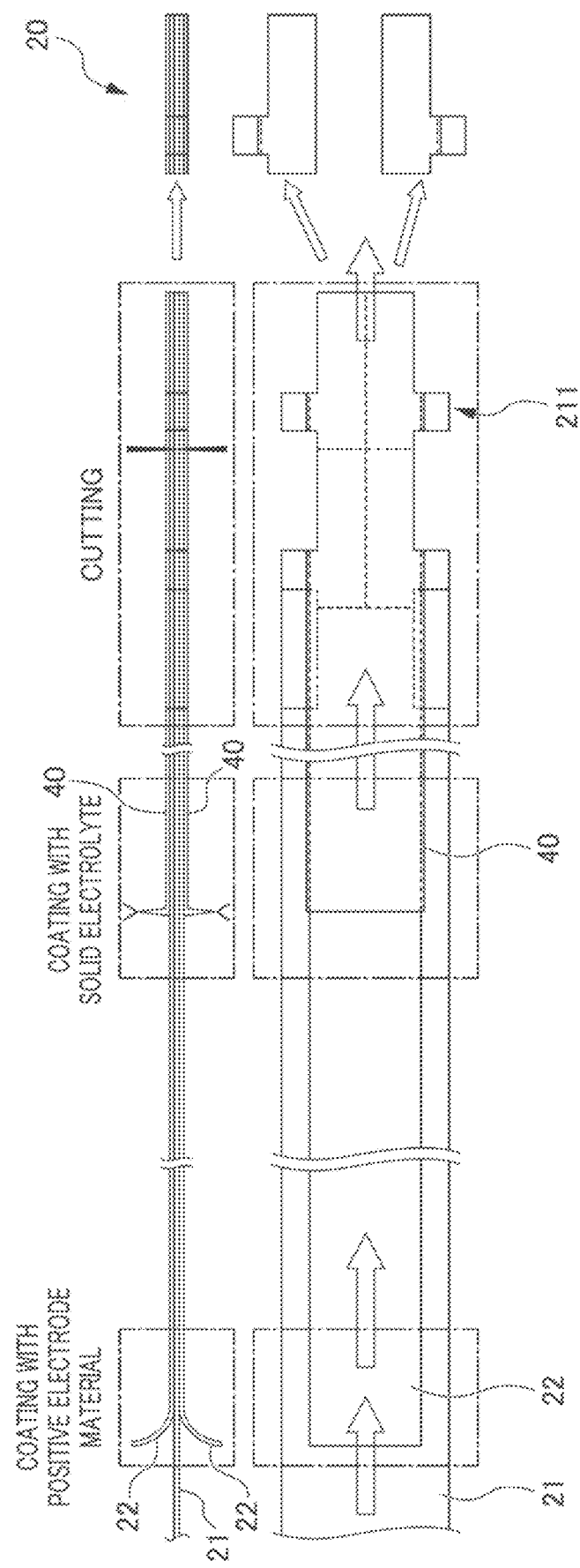
FIG. 10 is a diagram showing a process for producing an electrode for a solid-state battery according to the first embodiment of the present invention.

As shown in FIG. 10, the positive electrode material coating step S11 is a step of forming the positive electrode active material layer 22 on both surfaces of the sheet-shaped positive electrode current collecting plate 21. The method of forming the positive electrode active material layer 22 is not particularly limited, and examples thereof include a method of preparing a positive electrode mixture containing the positive electrode active material and applying the positive electrode mixture onto a positive electrode current collector. The method of applying the positive electrode mixture coating is not particularly limited, and examples thereof include a doctor blade method, spray coating, screen printing, or the like. The drying step S12 is a step of drying the coated positive electrode mixture, and the drying method is not particularly limited.

As shown in FIG. 10, the solid electrolyte coating step S13 is a step of forming the solid electrolyte layer 40 on both surfaces of the sheet-shaped positive electrode current collecting plate 21 having the positive electrode active material layers 22 formed on both surfaces thereof. The method of forming the solid electrolyte layer 40 is not particularly limited, and examples thereof include a method of applying a solid electrolyte by a doctor blade method, a spray coating, screen printing, or the like as in the positive electrode material coating step S11. The drying step S14 is a step of drying the coated solid electrolyte layer 40, and the drying method is not particularly limited.

The cutting step S15 is a step of forming the positive electrode tab 211 by cutting the sheet-shaped positive electrode current collecting plate 21 in a predetermined size.

As shown in FIG. 12, the bipolar electrode plate producing process S2 includes an electrode material coating step S21, a drying step S22, a perforating step S23, a solid electrolyte coating step S24, a drying step S25, and a cutting step 26 in this order.

Figure 9:
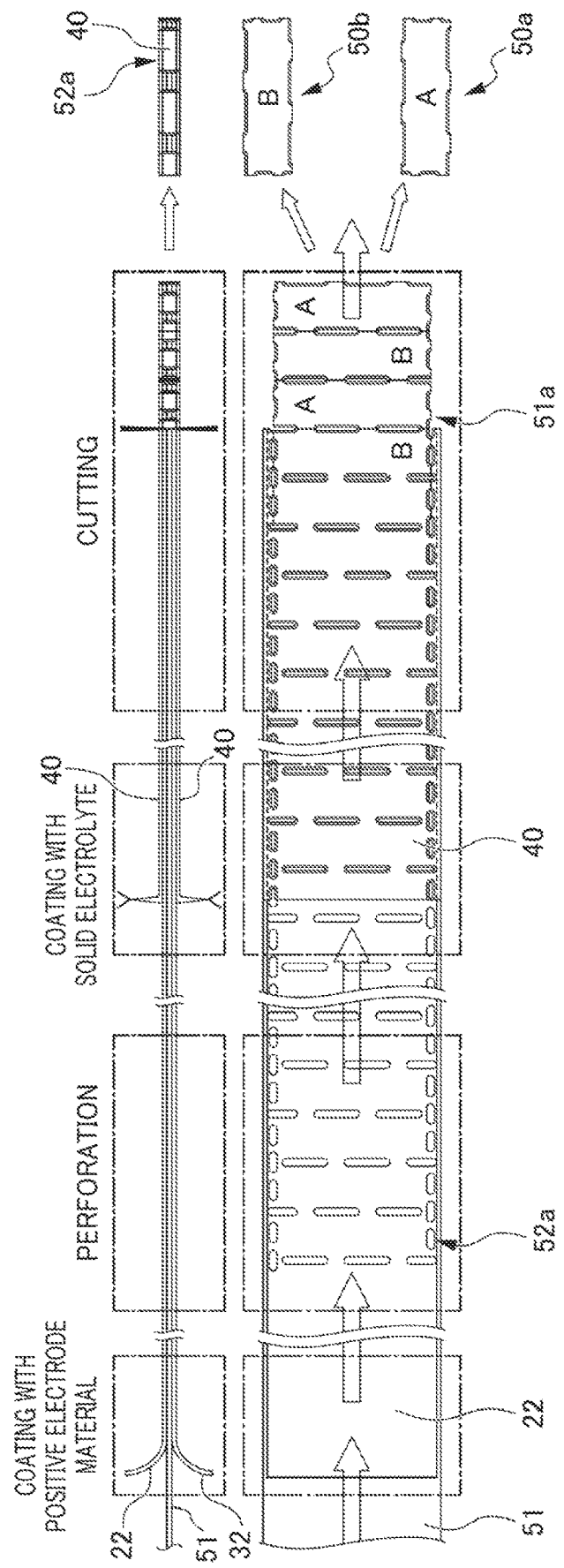
FIG. 9 is a diagram showing a process for producing the bipolar electrode plate according to the first embodiment of the present invention.

As shown in FIG. 9, the electrode material coating step S21 is a step of forming the positive electrode active material layer 22 on one surface of the sheet-shaped current collecting plate 51 and forming the negative electrode active material layer 32 on the other surface of the sheet-shaped current collecting plate 51. Specifically, the same steps as the electrode material coating step S11 and the electrode material coating step S31 can be adopted. The drying step S22 is a step of drying the coated positive electrode mixture and negative electrode mixture, and the drying method is not particularly limited.

The perforating step S23 is a step of forming holes in the sheet-shaped current collecting plate 51 having the positive electrode active material layer 22 and the negative electrode active material layer 32 formed on both surfaces thereof, respectively. The method of forming the holes is not particularly limited, and conventionally known methods such as a method of punching with a punching die, laser processing, and the like can be used. It is preferable that the perforating step S23 is a step of forming holes in rows such that the holes in adjacent ones of the rows are staggered with each other. As a result, the bipolar electrode plates 50a and 50b having two types of shapes that are in a mirror-image relation can be produced from a single sheet-shaped current collecting plate 51.

As shown in FIG. 9, the solid electrolyte coating step S24 is a step of forming the solid electrolyte layer 40 on both the surfaces of the sheet-shaped current collecting plate 51, both the surfaces of which respectively have thereon the positive electrode active material layer 22 and the negative electrode active material layer 32 and which has the holes formed therein. The method of forming the solid electrolyte layer 40 is not particularly limited, and examples thereof include a method of applying a solid electrolyte by a doctor blade method, spray coating, screen printing, or the like as in the positive electrode material coating step S11. By coating the current collecting plate 51 having the holes formed therein with the solid electrolyte, the solid electrolyte spreads over the end faces of the holes, whereby the solid electrolyte layer 40 can also be formed on the end faces of the holes. The drying step S25 is a step of drying the coated solid electrolyte layer 40, and the drying method is not particularly limited.

The cutting step S26 is a step of cutting the sheet-shaped current collecting plate 51 along a cutting line extending across the holes formed in the perforating step S23, thereby forming the bipolar electrode plates 50a and 50b having the convex portions 51a and the concave portions 52a on the end surfaces thereof.

According to the bipolar electrode plate producing process S2 including the above steps, it is possible to produce the bipolar electrode plates 50a and 50b having the convex portions 51a and the concave portions 52a formed on the end surfaces thereof and the solid electrolyte layer 40 formed on the end surfaces of the concave portions 52a. In other words, the feature in which cutting the sheet-shaped current collecting plate 51 is preceded by coating the end faces of the holes with the solid electrolyte makes it possible to produce the bipolar electrode plates 50a and 50b each having the solid electrolyte layer 40 formed on at least a part of the end face thereof, which is preferable from the viewpoint of production efficiency of the bipolar electrode plates 50a and 50b.

As shown in FIG. 12, the negative electrode plate producing process S3 includes a negative electrode material coating step S31, a drying step S32, a solid electrolyte coating step S33, a drying step S34, and a cutting step 35 in this order. The negative electrode plate producing process S3 is the same as the positive electrode plate producing process S1 except that the negative electrode active material layer 32 is formed on both surfaces of the sheet-shaped negative electrode current collecting plate 31 in the negative electrode material coating step S31.

The laminating step S4 is a step of laminating the positive electrode plate 20 produced in the positive electrode plate producing process S1, the bipolar electrode plates 50a and 50b produced in the bipolar electrode plate producing process S2, and the negative electrode plate 30 produced in the negative electrode plate producing process S3. In the laminating step S4, the bipolar electrode plates 50a and 50b are alternately laminated, and the positive electrode plate 20 and the negative electrode plate 30 are arranged at both end portions of the laminate.

The pressurizing step S5 is a step of pressurizing the laminate of the positive electrode plate 20, the bipolar electrode plates 50a and 50b, and the negative electrode plates 30 while pinching them by a press machine or the like.

Hereinafter, other embodiments of the present invention will be described. The description on the same configuration as the foregoing configuration may be omitted.

Second Embodiment

[Laminate]

Figure 5:
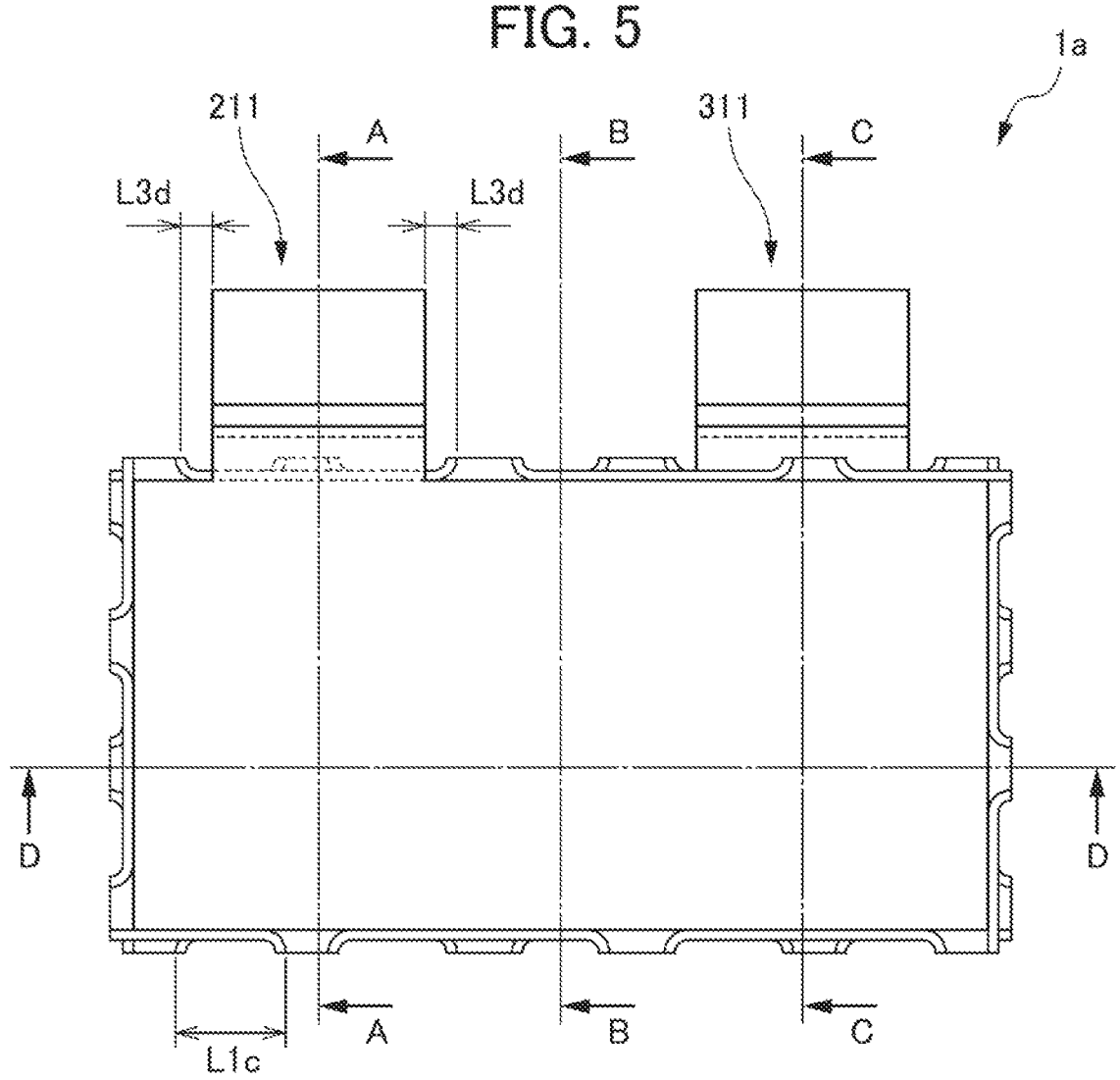
FIG. 5 is a diagram showing an outline of a laminate according to a second embodiment of the present invention.

FIG. 5 is a diagram showing an outline of a laminate 1a of the solid-state battery laminate according to the second embodiment. As shown in FIGS. 5 and 6A to 6D, the laminate 1a is configured so that a positive electrode plate 20a and a negative electrode plate 30a are arranged at both end portions of the laminate, and two types of bipolar electrode plates 50c and 50d are alternately laminated between the positive electrode plate 20a and the negative electrode plate 30a.

In the present embodiment, the solid electrolyte layer 40 is not formed on the lamination surface of the positive electrode plate 20a and the lamination surface of the negative electrode plate 30a as shown in FIGS. 6A to 6D. Therefore, the solid electrolyte layer is not formed on the surface of the positive electrode tab 211 and the surface of the negative electrode tab 311. This configuration makes it possible to simplify the producing process of the laminate 1a. On the other hand, in the laminate 1a, it is necessary to ensure insulation between the positive and negative electrode tabs 211 and 311 and the bipolar electrode plates adjacent thereto.

Figure 6B:
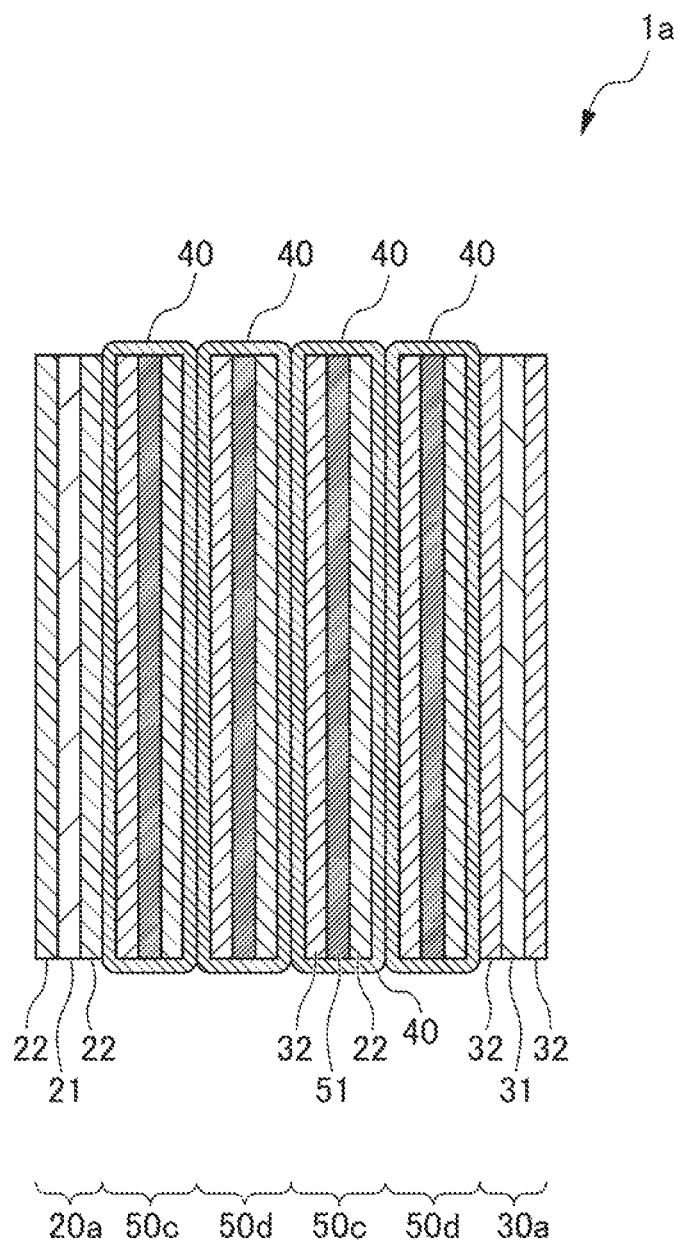
FIG. 6B is a cross-sectional view taken along a line B-B of FIG. 5.
Figure 6C:
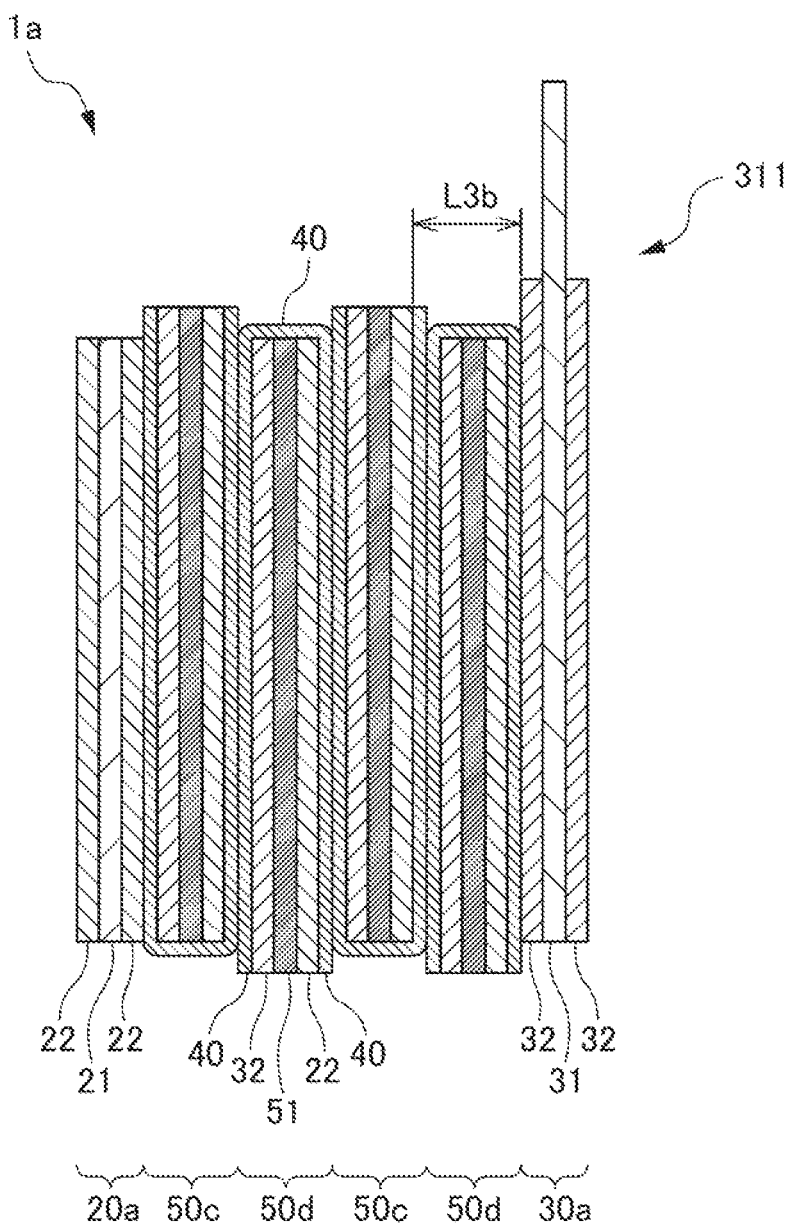
FIG. 6C is a cross-sectional view taken along a line C-C of FIG. 5.
Figure 6D:
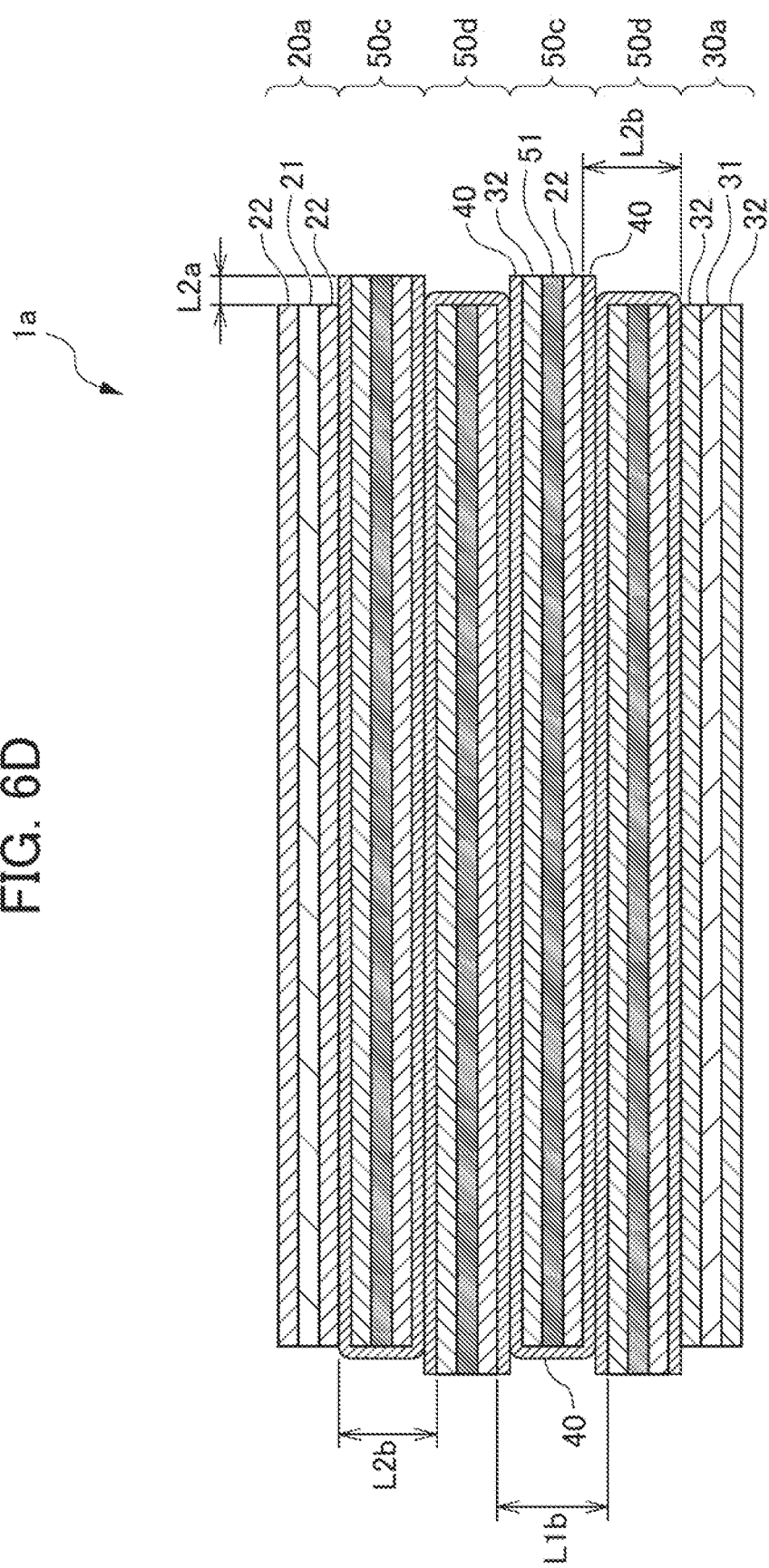
FIG. 6D is a cross-sectional view taken along a line D-D of FIG. 5.
Figure 7:
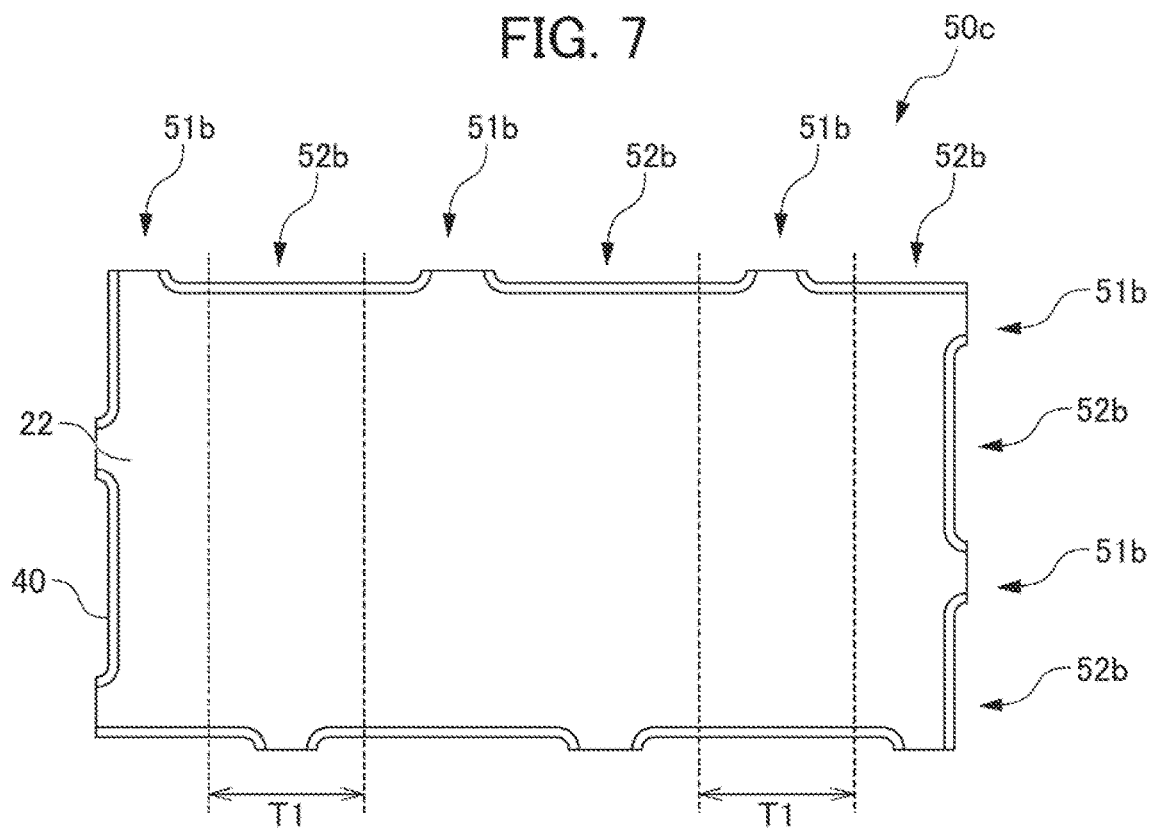
FIG. 7 is a diagram showing an outline of a bipolar electrode plate according to a second embodiment of the present invention.
Figure 8:
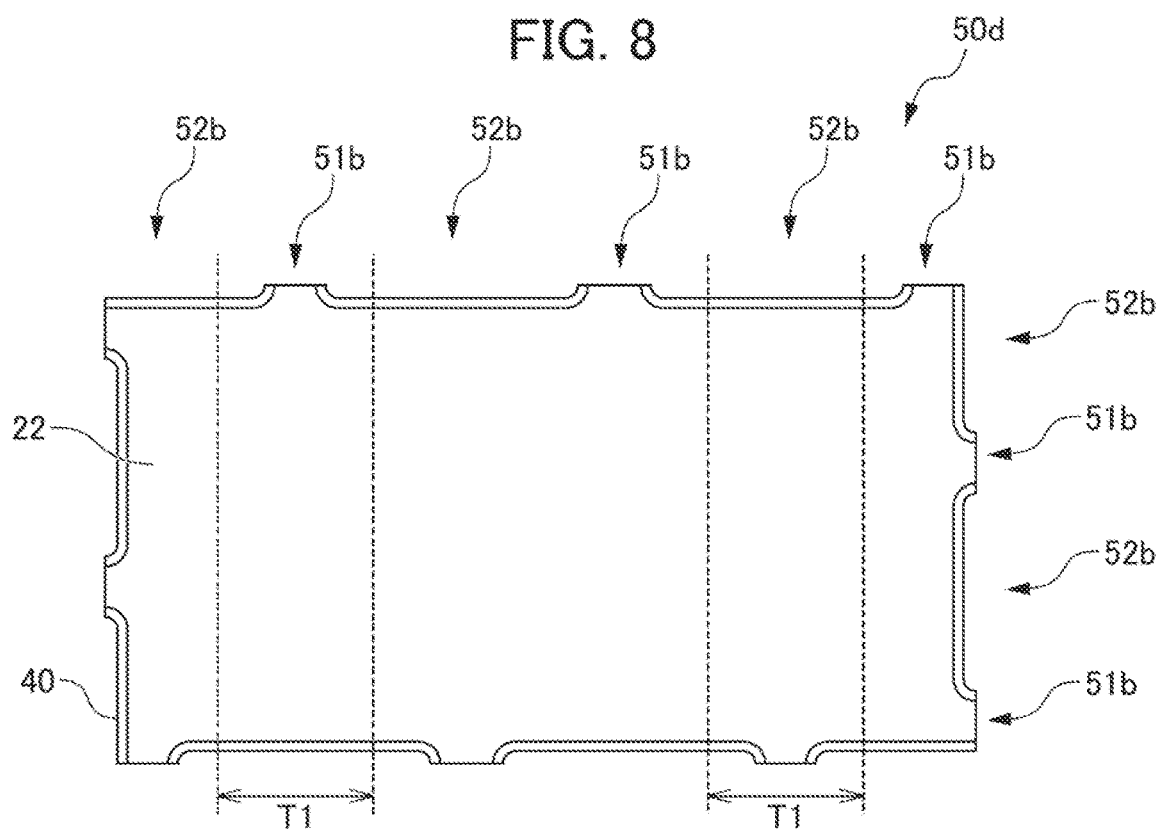
FIG. 8 is a diagram showing an outline of a bipolar electrode plate according to the second embodiment of the present invention.

The configurations of the bipolar electrode plates 50c and 50d are shown in FIGS. 7 and 8, respectively. FIGS. 7 and 8 are diagrams respectively showing the bipolar electrode plates 50c and 50d as viewed from the lamination surface side on which the positive electrode active material layer 22 is formed. The bipolar electrode plates 50c and 50d have shapes which are mutually in a mirror-image relation, and end faces of which are provided with convex portions 51b and concave portions 52b that are alternately formed. The solid electrolyte layer 40 is not formed on the convex portions 51b, whereas the solid electrolyte layer 40 is formed in the concave portions 52b. In the laminate 1a, the bipolar electrode plates 50c and 50d are alternately laminated as shown in FIGS. 6A to 6D.

In the present embodiment, the bipolar electrode plate arranged adjacent to the positive electrode plate 20a is a bipolar electrode plate 50c, and the bipolar electrode plate arranged adjacent to the negative electrode plate 30a is a bipolar electrode plate 50d. Therefore, an even number of laminated bipolar electrode plates are included in this embodiment.

The concave portion 52b formed on the end face of the bipolar electrode plate 50c is arranged at a position corresponding to the positive electrode tab 211 having the width T1 as shown in FIGS. 5 and 7. Similarly, the concave portion 52b formed on the end face of the bipolar electrode plate 50d is arranged at a position corresponding to the negative electrode tab 311 having the width T1 as shown in FIGS. 5 and 7. The concave portions 52b are each wider than the positive electrode tab 211 and the negative electrode tab 311, and the end faces of the concave portions 52b have the solid electrolyte layer 40 formed thereon. This configuration makes it possible to ensure the insulation between the positive electrode tab 211 and the bipolar electrode plate 50c adjacent thereto, and the insulation between the negative electrode tab 311 and the bipolar electrode plate 50d adjacent thereto.

As shown in FIGS. 5, 6A, and 6D, an insulation distance L1c can be ensured between the convex portions 51a of the bipolar electrode plates 50c and 50d as viewed in the laminating direction, and an insulation distance L1b can be ensured as viewed on a cross-section of the laminate.

As shown in FIGS. 6A and 6D, the insulation distance L2a and the insulation distance L2b can be ensured between the convex portions 51a and the end faces of the positive electrode plate 20 and the negative electrode plate 30 on which the positive electrode tab 211 and the negative electrode tab 311 are not arranged as viewed on a cross-section of the laminate.

As shown in FIG. 5, an insulation distance L3d can be ensured between the positive electrode tab 211 and the convex portion 51a of the bipolar electrode plate 50c as viewed in the laminating direction. This is true of the negative electrode tab 311 and the convex portion 51a of the bipolar electrode plate 50d. Further, as shown in FIG. 6A, an insulation distance L3b can be ensured between the positive electrode tab 211 and the convex portion 51a of the bipolar electrode plate 50d as viewed on a cross-section of the laminate. Similarly, as shown in FIG. 6C, an insulation distance L3c can be ensured between the negative electrode tab 311 and the convex portion 51a of the bipolar electrode plate 50c as viewed on a cross-section of the laminate. In other words, the concave portions 52b having the solid electrolyte layer 40 formed on the end faces thereof are provided at positions corresponding to the positive electrode tab 211 and the negative electrode tab 311 in the bipolar electrode plates adjacent to the positive electrode plate 20a and the negative electrode plate 30a. As a result, even when the positive electrode plate 20a and the negative electrode plate 30a do not have the solid electrolyte layer 40, the insulation distances L3b, L3c, and L3d can be ensured between the positive and negative electrode plates 20a and 30a and the convex portions 51a of the bipolar electrode plates.

<Method of Manufacturing Solid-State Battery>

Figure 13:
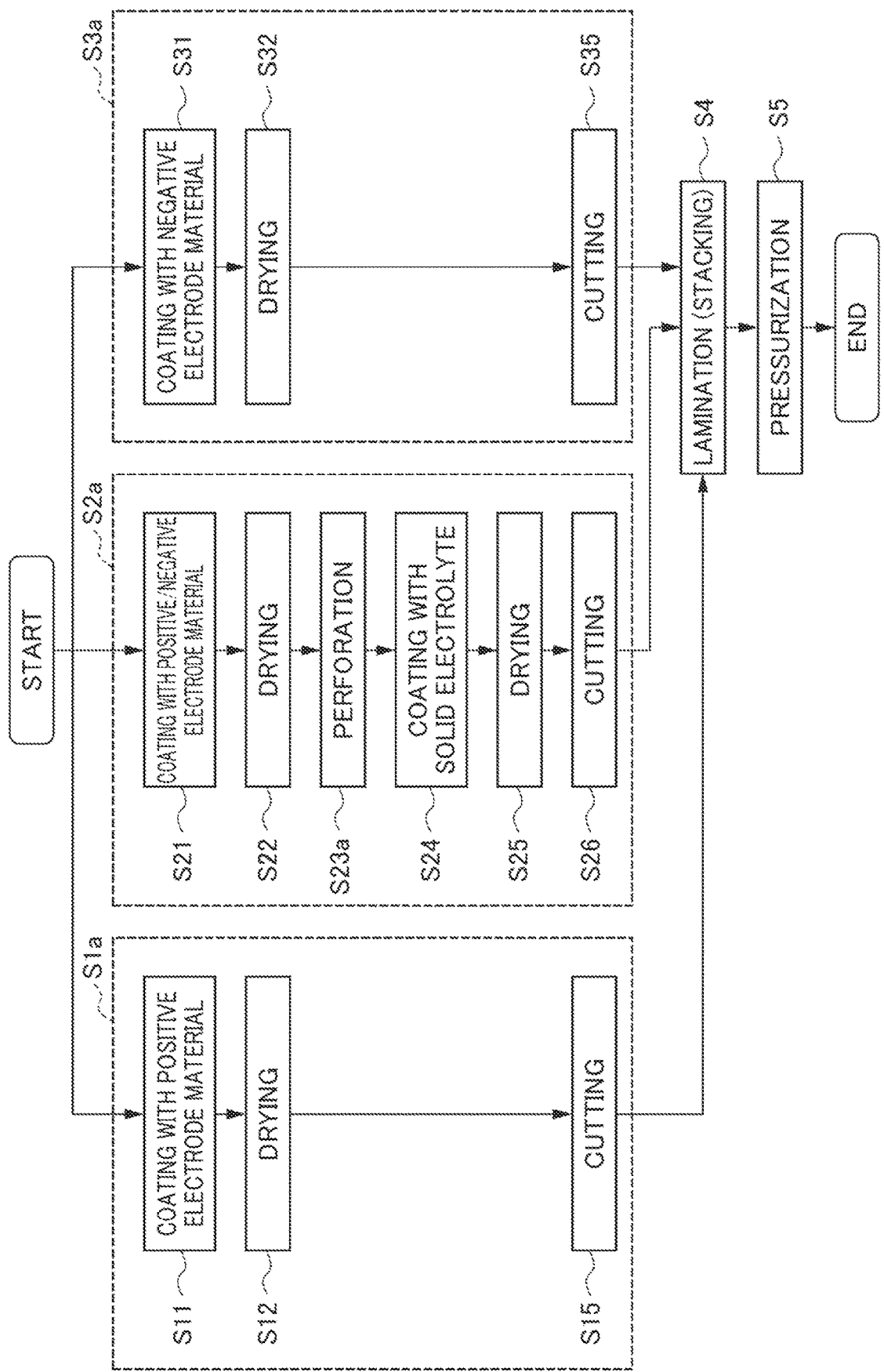
FIG. 13 is a flowchart showing a process for manufacturing a solid-state battery according to the second embodiment of the present invention.

As shown in FIG. 13, the method of manufacturing the solid-state battery according to the present embodiment includes a positive electrode plate producing process S1a, a bipolar electrode plate producing process S2a, a negative electrode plate producing process S3a, a laminating step S4, and a pressurizing step S5.

The positive electrode plate producing process S1a and the negative electrode plate producing process S3a are the same as the positive electrode plate producing process S1 and the negative electrode plate producing process S3 except that the processes S1a and S3a do not include the solid electrolyte coating steps S13 and S33 and the drying steps S14 and S34.

As shown in FIG. 13, the bipolar electrode plate producing process S2a includes an electrode material coating step S21, a drying step S22, a perforating step S23a, a solid electrolyte coating step S24, a drying step S25, and a cutting step 26 in this order. The respective steps of the bipolar electrode plate producing process S2a are the same as those of the bipolar electrode plate producing process S2 except that the perforating step S23a is different from the perforating step of the bipolar electrode plate producing process S2.

Figure 11:
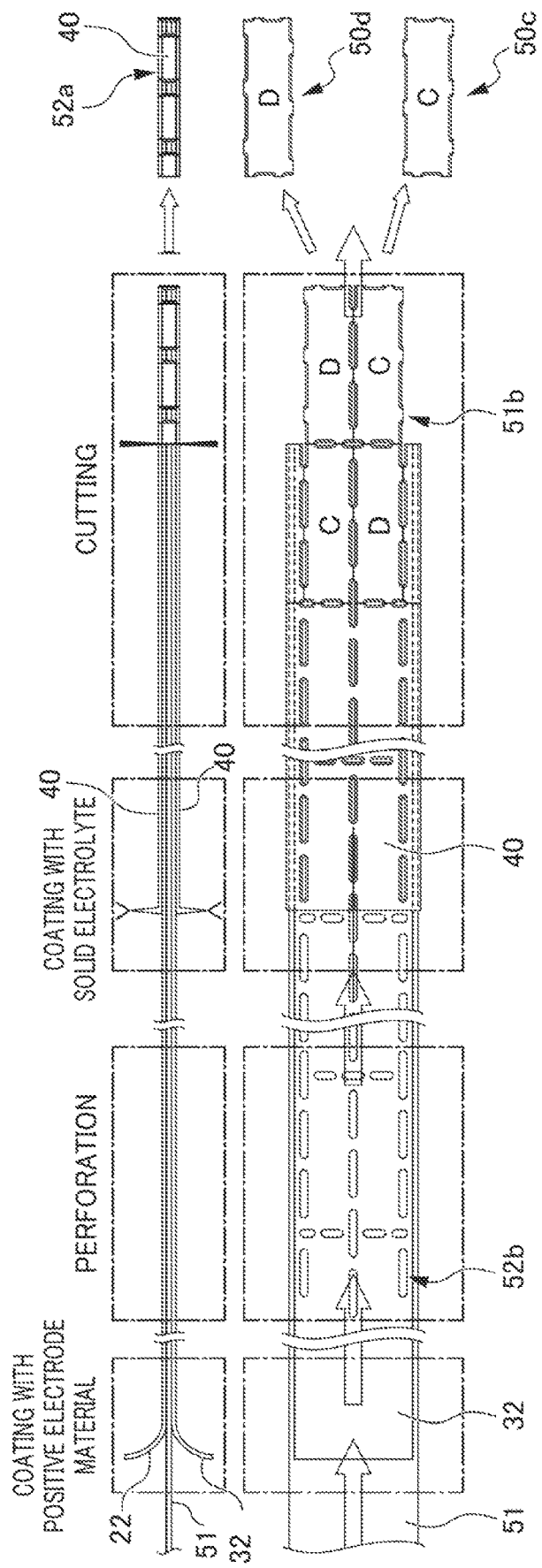
FIG. 11 is a diagram showing a process for producing the bipolar electrode plate according to the second embodiment of the present invention.

As shown in FIG. 11, the perforating step S23a is a step of forming holes in the sheet-shaped current collecting plate 51 having the positive electrode active material layer 22 and the negative electrode active material layer 32 formed on both surfaces thereof, respectively. The holes may be formed by the same method as in the first embodiment. It is preferable that the perforating step S23a is a step of forming the holes in rows such that the holes in adjacent ones of the rows are staggered, as in the perforating step S23 shown in FIG. 11. As a result, the bipolar electrode plates 50c and 50d having two types of shapes that are in a mirror-image relation can be produced from a single sheet-shaped current collecting plate 51.

The perforating step S23a forms the holes in the current collecting plate 51 such that the bipolar electrode plates are produced in two rows along a sheet flowing direction, from a single sheet-shaped current collecting plate 51. The bipolar electrode plates in the two rows are produced so that the adjacent bipolar electrode plates are mutually in a mirror-image relation.

While the preferred embodiments of the present invention have been described above, the present invention is not limited to the above embodiments, and the scope of the invention also include appropriate modifications of the embodiments. The perforating step S23 of the bipolar electrode plate producing process S2 according to the method of manufacturing the solid-state battery of the first embodiment has been described with reference to FIG. 9, and the perforating step S23a of the bipolar electrode plate producing process S2a according to the method of manufacturing the solid-state battery of the second embodiment has been described with reference to FIG. 11. However, the perforating step of the present invention is not limited to the foregoing steps. Each of the perforating step shown in FIG. 9 and the perforating step shown in FIG. 11 can be applied to both the perforating step S23 and the perforating step S23a.

EXPLANATION OF REFERENCE NUMERALS 1, 1a, 1b: Laminate
20, 20a, 20b: Positive electrode plate
211: Positive electrode tab (electrode tab)
30, 30a, 30b: Negative electrode plate
311: Negative electrode tab (electrode tab)
40: Solid electrolyte layer
50a, 50b, 50c, 50d: Bipolar electrode plate
51a, 51b: Convex portion
52a, 52b: Concave portion

What is claimed is:

1. A solid-state battery comprising:
a laminate including a positive electrode plate, a plurality of bipolar electrode plates, and a negative electrode plate that are laminated; and
a solid electrolyte layer formed on a lamination surface of each of the plurality of bipolar electrode plates, wherein
each of the plurality of bipolar electrode plates has, on an end face thereof as viewed from a lamination surface side, a concave portion on which the solid electrolyte layer is formed and a convex portion on which the solid electrolyte layer is not formed, the concave portion and the convex portion being alternately formed,
adjacent ones of the plurality of bipolar electrode plates have shapes that are mutually in a mirror-image relation, and
the concave portion and the convex portion are arranged to be staggered between adjacent ones of the plurality of bipolar electrode plates.

2. The solid-state battery according to claim 1, wherein the solid electrolyte layer is formed on at least a part of the end face of each of the plurality of bipolar electrode plates.

3. The solid-state battery according to claim 1, wherein the concave portion of one of the plurality of bipolar electrode plates that is arranged adjacent to the positive electrode plate or the negative electrode plate is arranged at a position corresponding to an electrode tab extending from the positive electrode plate or the negative electrode plate and is larger in width than the electrode tab.

4. The solid-state battery according to claim 1, wherein the solid electrolyte layer is formed on a lamination surface of the positive electrode plate and a lamination surface of the negative electrode plate.

5. A method of manufacturing a solid-state battery, the method including a bipolar electrode plate producing process for producing the bipolar electrode plates according to claim 1,
the bipolar electrode plate producing process comprising, in sequence:
an electrode material coating step of coating one surface of a current collecting plate with a positive electrode material and coating the other surface of the current collecting plate with a negative electrode material;
a perforating step of forming a hole in a part of the current collecting plate coated with the positive and negative electrode materials;
a solid electrolyte coating step of coating, with a solid electrolyte, the current collecting plate coated with the positive and negative electrode materials; and
a cutting step of cutting the current collecting plate coated with the positive and negative electrode materials along a cutting line extending across the hole so that a concave portion is formed at an edge of the current collecting plate.

6. The method of manufacturing a solid-state battery according to claim 5, wherein
in the bipolar electrode plate producing process, the perforating step includes forming the hole comprising a plurality of holes in rows such that the holes in adjacent ones of the rows are staggered, thereby producing the bipolar electrode plates having two types of shapes that are mutually in a mirror-image relation.

* * * * *